US012288416B2

(12) United States Patent
Mumm et al.

(10) Patent No.: US 12,288,416 B2
(45) Date of Patent: Apr. 29, 2025

(54) SECURE BIOMETRIC METADATA GENERATION

(71) Applicant: Snap Inc., Santa Monica, CA (US)

(72) Inventors: Jonathan Mumm, Marina del Rey, CA (US); Donald Holly, Venice, CA (US); Faisal Alqadi, Santa Monica, CA (US); Jonathan Brody, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/489,651

(22) Filed: Oct. 18, 2023

(65) Prior Publication Data

US 2024/0046697 A1    Feb. 8, 2024

Related U.S. Application Data

(63) Continuation of application No. 17/662,524, filed on May 9, 2022, now Pat. No. 11,804,073, which is a continuation of application No. 16/394,792, filed on Apr. 25, 2019, now Pat. No. 11,328,153.

(60) Provisional application No. 62/662,562, filed on Apr. 25, 2018.

(51) Int. Cl.
*G06V 40/16* (2022.01)
*G06F 21/60* (2013.01)
*G06N 20/00* (2019.01)

(52) U.S. Cl.
CPC .......... *G06V 40/172* (2022.01); *G06F 21/602* (2013.01); *G06N 20/00* (2019.01); *G06V 40/161* (2022.01); *G06V 40/179* (2022.01)

(58) Field of Classification Search
CPC .................. G06F 21/32; G06F 21/602; G06K 2009/00328; G06K 9/00228
See application file for complete search history.

(56) References Cited

U.S. PATENT DOCUMENTS

| | | |
|---|---|---|
| 11,328,153 B1 | 5/2022 | Mumm et al. |
| 2012/0250950 A1 | 10/2012 | Papakipos et al. |
| 2014/0289595 A1 | 9/2014 | Park et al. |
| 2014/0358954 A1 | 12/2014 | Kocher et al. |

(Continued)

FOREIGN PATENT DOCUMENTS

JP    2007521577 A    8/2007

OTHER PUBLICATIONS

"U.S. Appl. No. 16/394,792, Non Final Office Action mailed Aug. 5, 2020", 9 pgs.

(Continued)

*Primary Examiner* — Sam Bhattacharya
(74) *Attorney, Agent, or Firm* — Schwegman Lundberg & Woessner, P.A.

(57) ABSTRACT

Systems, devices, media and methods are presented for generating biometric image data. In one example, a system accesses a set of images stored on a mobile computing device. The system identifies one or more faces depicted in the set of images and generates a set of face images from the set of images. The system determines a set of positions of a set of facial features depicted within the set of face images and generates a set of biometric reference maps based on the set of positions. The system transmits the set of face images to a reference server and stores the set of biometric reference maps on the mobile computing device.

20 Claims, 6 Drawing Sheets

(56) References Cited

U.S. PATENT DOCUMENTS

| | | |
|---|---|---|
| 2016/0232402 A1 | 8/2016 | Jiang |
| 2017/0069056 A1* | 3/2017 | Sachs .................. G06T 17/20 |
| 2017/0091774 A1 | 3/2017 | White |
| 2017/0316598 A1 | 11/2017 | Wang et al. |
| 2019/0149767 A1 | 5/2019 | Turbell |
| 2022/0375260 A1 | 11/2022 | Mumm et al. |

OTHER PUBLICATIONS

"U.S. Appl. No. 16/394,792, Notice of Allowance mailed Jan. 12, 2022", 8 pgs.

"U.S. Appl. No. 16/394,792, Notice of Allowance mailed Jan. 25, 2021", 7 pgs.

"U.S. Appl. No. 16/394,792, Notice of Allowance mailed May 10, 2021", 8 pgs.

"U.S. Appl. No. 16/394,792, Response filed Jan. 5, 2021 to Non Final Office Action mailed Aug. 5, 2020", 9 pgs.

"U.S. Appl. No. 17/662,524, Non Final Office Action mailed Mar. 2, 2023", 13 pgs.

"U.S. Appl. No. 17/662,524, Notice of Allowance mailed Jun. 27, 2023", 7 pgs.

"U.S. Appl. No. 17/662,524, Preliminary Amendment Filed Aug. 12, 2022", 7 pgs.

"U.S. Appl. No. 17/662,524, Response filed May 25, 2023 to Non Final Office Action mailed Mar. 2, 2023", 11 pgs.

\* cited by examiner

SECURE BIOMETRIC METADATA GENERATION

CROSS REFERENCE TO RELATED APPLICATIONS

This application is a continuation of U.S. patent application Ser. No. 17/662,524, filed on May 9, 2022, which is a continuation of U.S. patent application Ser. No. 16/394,792, filed on Apr. 25, 2019, now issued as U.S. Pat. No. 11,328,153, which claims the benefit of priority to U.S. Provisional Patent Application Ser. No. 62/662,562, filed on Apr. 25, 2018, the contents of each of which are incorporated herein by reference in their entireties.

TECHNICAL FIELD

Embodiments of the present disclosure relate generally to perform image processing on media stored in a mobile computing device. More particularly, but not by way of limitation, the present disclosure addresses systems and methods for securely generating biometric data from media stored on a mobile computing device.

BACKGROUND

Telecommunications applications and devices can provide communication between multiple users using a variety of media, such as text, images, sound recordings, and/or video recording. Some applications are able to identify elements within images or video recordings. Further, some applications collect information relating to subjects or objects identified within the images or video recordings. Such applications often recalculate or reidentify objects within media (e.g., images or video recordings) at each installation of the application, incurring time delays and processor expenditures. Similarly, some applications transfer the media to be analyzed, or portions thereof, to external resources to analyze and identify subjects or objects within the media. Often, such applications transfer identifying information relating to subjects and objects within media to data stores or repositories outside of the originating device. Such transfers are often unsecure or expose the identifying information to risk of exposure at the networked data stores or repositories.

BRIEF DESCRIPTION OF THE DRAWINGS

Various ones of the appended drawings merely illustrate example embodiments of the present disclosure and should not be considered as limiting its scope.

Figure 1:
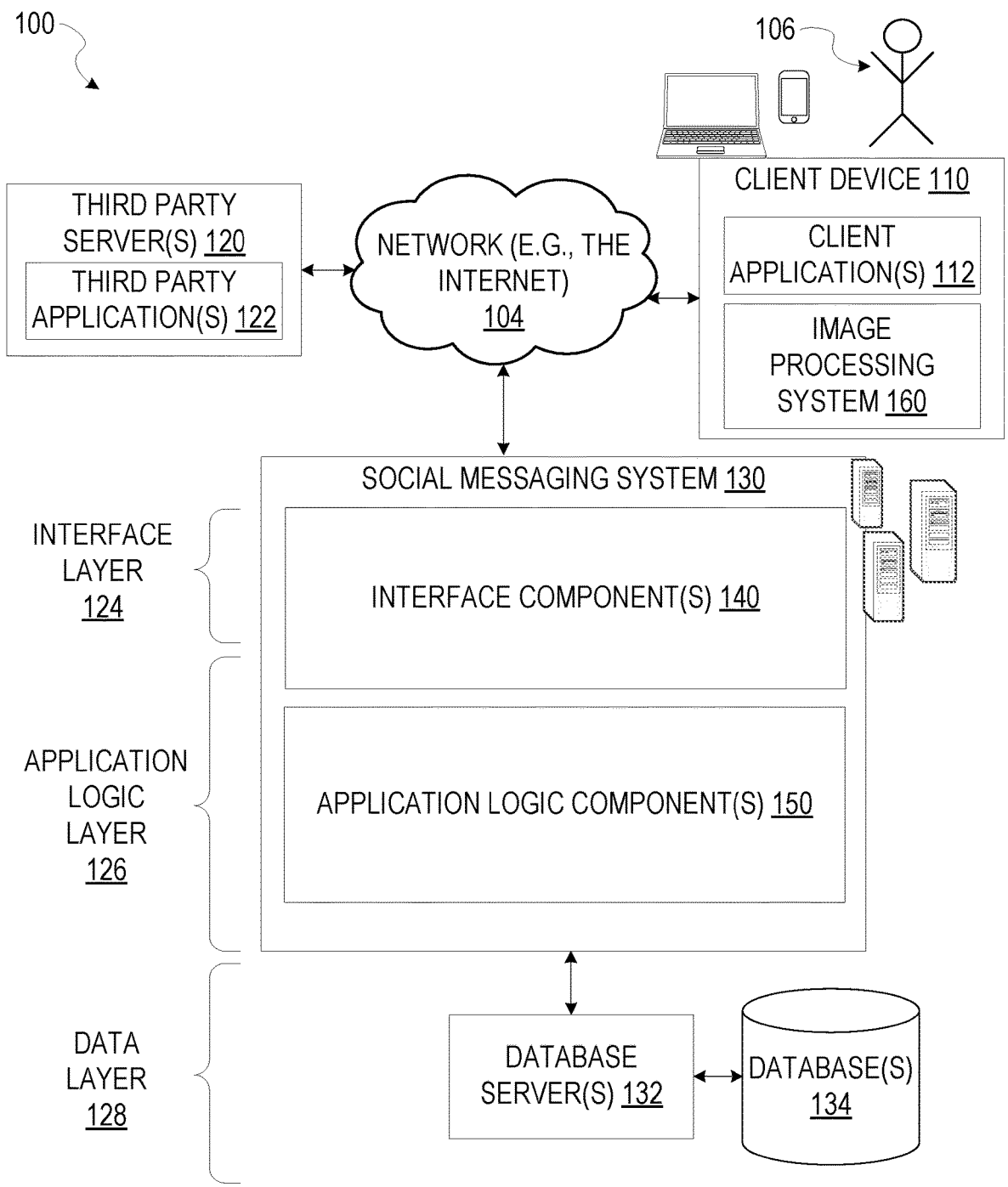
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

When a user captures images on a smartphone (e.g., a mobile computing device), an image processing application may run image analysis operations on the image. The image analysis operations may identify objects of interest, such as faces, within the images. For example, the image analysis operation may generate bounding boxes around faces and identify facial landmarks or points of interest. The bounding boxes and landmarks may be used to isolate the faces from the remaining portions of the images. The image processing application may then feed one or more of the image, the bounding boxes, and the facial landmarks into one or more biometric processing operations to generate or extract suitable attributes and biometric information. In some embodiments, the image processing application uses one or more neural network models to generate or extract the biometric information.

In some embodiments, after the biometric data is extracted, the isolated face images are transferred to a reference server, backing up the initial object/face identification. The biometric data may be retained at the mobile computing device to maintain privacy in the biometric data. In some embodiments, the biometric data is encrypted and stored on the mobile computing device. In the event of deleting/reinstalling of the image processing application or other corruption/removal of biometric data, the image processing application may retrieve the isolated face images from the reference server and subsequently generate or extract biometric data to replace data lost during the deletion, corruption, or removal of the biometric data.

Unlike previous systems, embodiments of the present disclosure are performant (e.g., endowed with more efficient performance and capabilities) by removing duplication of work performed to initially extract objects or faces from an image library upon reinstallation or relaunching of an application. In instances of reinstallation, embodiments of the present disclosure may fetch preprocessed data, in the form of the set of face images, rather than fully reprocessing an image library. Additionally, unlike previous systems, embodiments of the present disclosure ensure privacy in that biometric data is not shared or transferred away from the originating mobile computing device. Use of sharing/transferring biometric data off of an originating mobile computing device to a remote server removes a certain privacy and control and may introduce inherent insecurities, subjecting the biometric data to certain additional vulnerabilities.

The above is one specific example. The various embodiments of the present disclosure relate to devices and instructions by one or more processors of a device to analyze images stored on a computing device. An image processing system is described that analyzes images and securely generates metadata from the stored images. In some embodiments, the securely generated metadata is biometric face data associated with specified images.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third party server(s) 120 executing third party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of image processing system 160 such that components of the image processing system 160 configure the client device 110 to perform a specific set of functions with respect to operations of the image processing system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the image processing system 160 to securely generate biometric image data.

Each client device 110 can comprise a computing device that includes at least a display and communication capabilities with the network 104 to access the social messaging system 130, other client devices, and third party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client device 110. In some embodiments, the user 106 interacts with the social messaging system 130 via the client device 110. The user 106 may not be part of the networked system 100, but may be associated with the client devices 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

Although not shown in FIG. 1, the social messaging system 130 may include at least a portion of the image processing system 160 capable of generating biometric image data. Similarly, the client device 110 may include at least a portion of the image processing system 160, as described above. In other examples, client device 110 may include the entirety of the image processing system 160. In instances where the client device 110 includes a portion of (or all of) the image processing system 160, the client device 110 can work alone or in cooperation with the social messaging system 130 to provide the functionality of the image processing system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the image processing system 160 may analyze images and generate biometric image data. The device may generate the biometric image data as a part of a generation of content for an ephemeral message or analyzing a set of images prior to inclusion of the image in an ephemeral message or in response to receiving an image in an ephemeral message.

Figure 2:
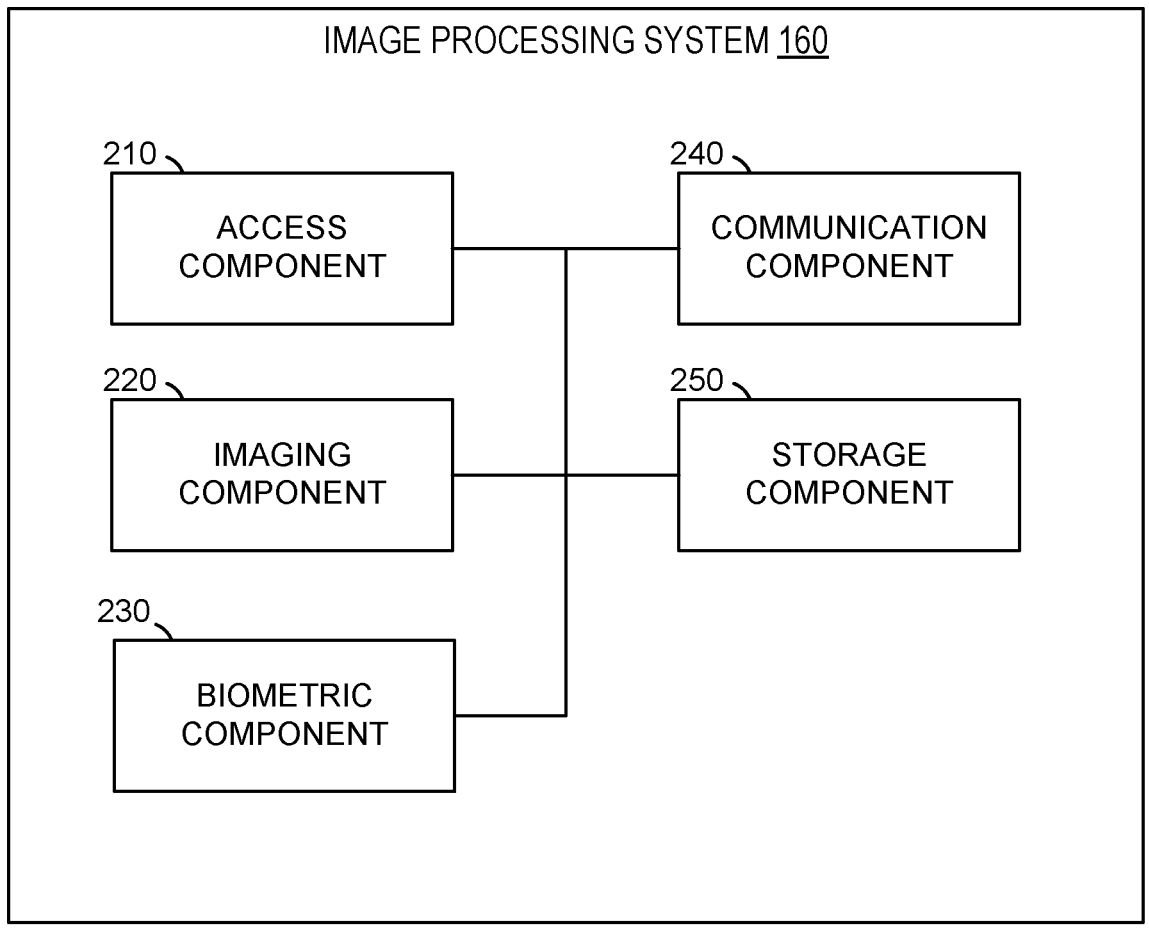
FIG. 2 is a diagram illustrating an image processing system, according to some example embodiments.

In FIG. 2, in various embodiments, the image processing system 160 can be implemented as a standalone system or implemented in conjunction with the client device 110, and is not necessarily included in the social messaging system 130. The image processing system 160 is shown to include an access component 210, an imaging component 220, a biometric component 230, a communication component 240, and a storage component 250. All, or some, of the components 210-250, communicate with each other, for example, via a network coupling, shared memory, and the like. Each component of components 210-250 can be implemented as a single component, combined into other components, or further subdivided into multiple components. Other components not pertinent to example embodiments can also be included, but are not shown.

Figure 3:
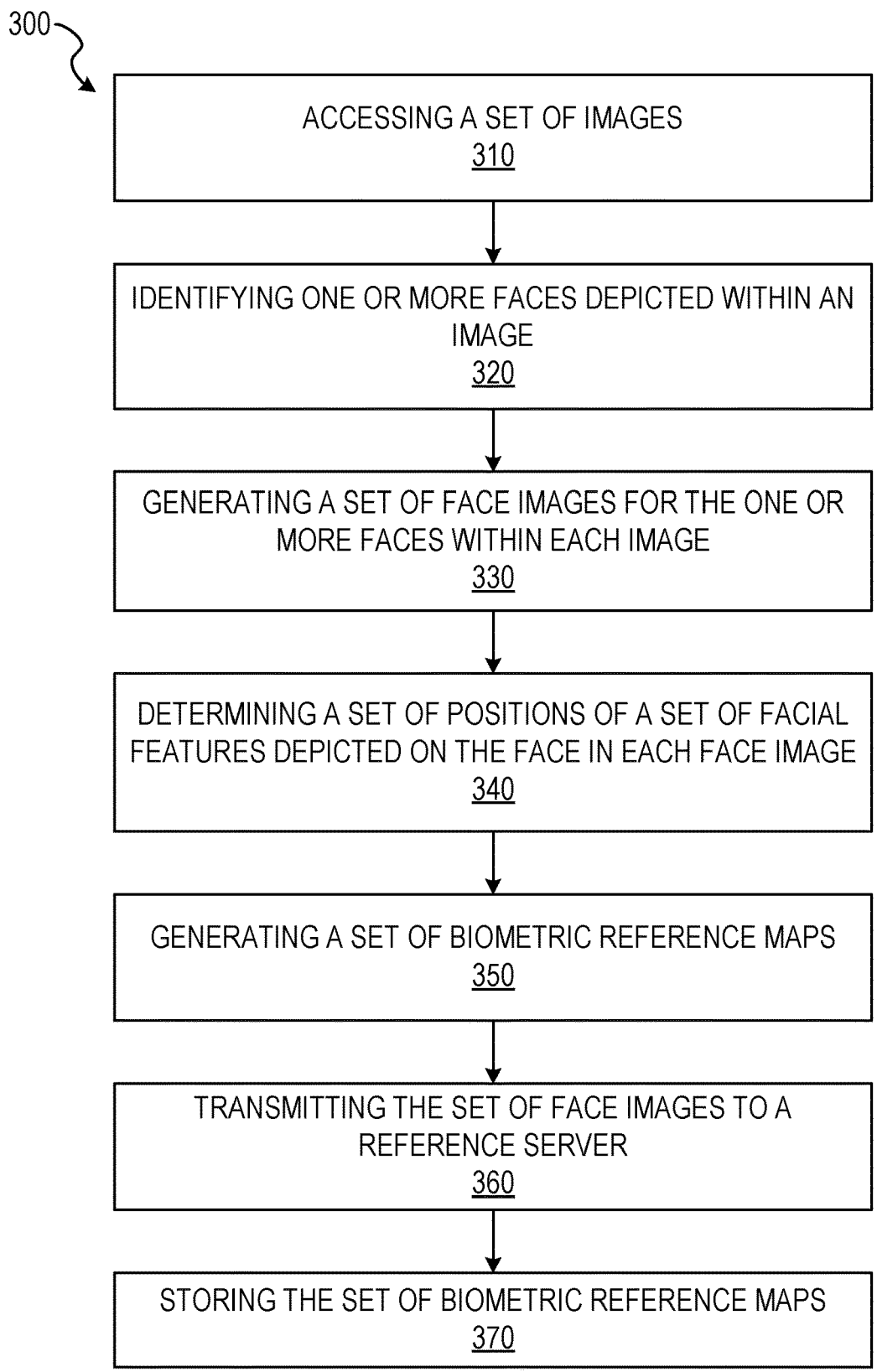
FIG. 3 is a flow diagram illustrating an example method for generating biometric image data, according to some example embodiments.

FIG. 3 depicts a flow diagram illustrating an example method 300 for generating biometric image data. The operations of method 300 may be performed by components of the image processing system 160, and are so described below for purposes of illustration.

In operation 310, the access component 210 accesses a set of images. In some embodiments, the set of images are stored on a mobile computing device. In some embodiments, the access component 210 accesses or receives the set of images in a memory or processor readable medium associated with or part of the mobile computing device. The set of images may be stored as a media, image, or photo library on the mobile computing device. The media, image, or photo library may be associated with a specified application or may be an aggregate library where images, video, and other media is stored on the mobile computing device regardless of the application responsible for capturing, receiving, or creating the media. The access component 210 may include the image capture device as a portion of hardware comprising the access component 210. In these embodiments, the access component 210 directly receives the set of images captured by the image capture device. In some instances, the access component 210 accesses or otherwise receives at least a portion of the set of images from repositories outside of the mobile computing device. For example, the access component 210 may access the set of images, or a portion thereof, on a reference server, a backup server, or other network accessible location accessible by the mobile computing device.

In operation 320, the imaging component 220, identifies one or more faces depicted within an image. In some embodiments, the imaging component 220 identified one or more faces within each image of the set of images.

In some embodiments, the imaging component 220 identifies a set of coordinates associated with the one or more faces within the image. The imaging component 220 may generate one or more bounding boxes around each face of the one or more faces.

In operation 330, the imaging component 220 generates a set of face images for the one or more faces within each image. In some embodiments, the set of face images includes a subset of pixels, of a specified image. The specified image may be associated with a face contained in the specified image. The set of face images may be understood as thumbnail images depicting a single face for biometric analysis.

In some embodiments, the imaging component 220 crops the image to isolate an image area including the face. The imaging component may perform one or more cropping procedures for each face of the one or more faces. The imaging component 220 may generate thumbnail images using cropping operations, where each thumbnail image includes a single face. In some embodiments, the thumbnail images may be limited to a 128 pixels×128 pixels area including the face. The imaging component 220 may then align the face within the image area by positioning the face within the image area according to one or more predefined parameters.

In some embodiments, the one or more predefined parameters include a position within the thumbnail. For example, the one or more parameters may include a relative alignment of the face within the thumbnail. The one or more parameters may additionally include a number of features included within the thumbnail, a distance of one or more facial features from an edge of the thumbnail, a distance of an edge of the face from an edge of the thumbnail, a proportion of face to body within the thumbnail, a contrast of the face, a focus sharpness value, an orientation of the face (e.g., right side up, eyes nearer a top portion and mouth nearer a bottom portion of the thumbnail) within the thumbnail, a skew or angle of the face (e.g., aligning a skewed or profiled face to a forward directed or front view face) within the thumbnail, combinations thereof, or any other suitable parameter. In some embodiments, one or more operations for generating the set of face images incorporate a frontalizing approach or a programming library associated with a frontalizing approach.

In some embodiments, where the imaging component 220 determines a face to be included in a face image depicts a number of facial features below a specified threshold, the imaging component 220 may reject the face for biometric mapping. For example, in some instances, the threshold number of features is five facial features. Where the imaging component 220 detects fewer than the five facial features depicted within an image or a face image, the imaging component 220 may disregard the face. Although described with respect to a specified value for the threshold, it should be understood that any suitable threshold may be used, such as 3, 4, 10, 100, 1,000, a threshold value between the provided examples, or any other suitable number.

In operation 340, the biometric component 230 determines a set of positions of a set of facial features depicted on the face in each face image. In some embodiments, each position corresponds to a facial feature of the face. The set of facial features may include a left eye, a right eye, a left portion of a mouth, a right portion of a mouth, and a point on a nose. In some instances, the set of facial features includes one or more points on a jaw, one or more points on a forehead, one or more points on an ear, one or more points on eyelids or around the eyes, one or more points corresponding to the nose (e.g., one or more points on the nostrils), one or more points surrounding or outlining the mouth, one or more points on the chin, one or more points on the cheekbones, one or more points between the nose and the mouth, one or more facial hair points (e.g., points on eyebrows, points on a moustache, points on a beard), combinations thereof, or any other suitable points or features. Although described with reference to a face, it should be understood that the biometric component 230 may identify features of objects other than faces. In such embodiments, the features or points on an object of interest may be based on a size, shape, and dimensions of an object; a type of object; colors depicted on an object; combinations thereof; or any other suitable distinguishing features capable of identifying and distinguishing the object from other objects in the image and other objects capable of being identified by image processing operations.

In some embodiments, the set of positions of the set of facial features are identified as pixel coordinates or locations, locations relative to one or more edges of a cropped image or facial image, or any other suitable position at which a feature may be located. For example, a facial image may be divided or segmented into a pixel-based coordinate scheme, with each facial feature being assigned or located at a coordinate or a pixel location within the pixel-based coordinate scheme.

In some embodiments, the face is aligned after determining the set of facial features and the positions of the set of facial features. In such instances, once the features are identified and the positions determined, the biometric component 230 or the imaging component 220 may normalize or align a position (e.g., position of the face within the face image), an orientation (e.g., right-side up), and/or a skew (e.g., an angled face or profiled face) within the face image. In some embodiments, the biometric component 230 and the imaging component 220 may perform normalization or alignment operations based on relative positions of the set of features. For example, once a left eye position, a right eye position, two mouth positions, and a nose position are identified, the imaging component 220 may determine an angle of the face based on a point representing the nose position being closer to one eye than the other. Where the point of the nose position is outside of a threshold alignment, the imaging component 220 may skew, align, or otherwise correct the angle of the face within the face image to generate a modified and forward-oriented face.

In some embodiments, the biometric component 230 determines values for characteristics depicted on a face, associated with a face, or depicted within the face image. In some instances, the values are incorporated into the biometric reference maps or other metadata corresponding to an underlying image. The characteristics may be characteristics in addition to the set of features and positions of features used to generate the biometric reference map for a specified face image or face/object depicted in an underlying image.

In operation 350, the biometric component 230 generates a set of biometric reference maps based on the set of positions of the set of facial features. In some embodiments, each biometric reference map corresponds to a face within a face image. The set of biometric reference maps may be used to cluster images, from the set of images, based on faces or objects appearing in the image and for other suitable purposes. Although described with respect to image clustering, it should be understood that the set of biometric reference maps may be used in facial recognition, object recognition, organization operations, authentication, and other suitable applications, operations, or processes.

The biometric component 230 may generate the set of biometric reference maps by passing the set of facial positions and the face images into one or more machine learned models. The machine learned models may be image processing models, image recognition models, neural network models, fully connected neural network models, or any other suitable machine learned models. The machine learned models may return one or more outputs capable of being used to identify the face in other images stored on the mobile computing device. In some embodiments a single or set of neural network models may be generated and trained for each face identified by the imaging component 220. In such instances, the face-specific neural network model may be used to identify further instances of the face within the set of images accessed by the access component 210. The machine learned models may receive as input the face images, the set of features, the positions for the set of features, metadata from the underlying image (e.g., a location at which the image was taken, a time at which the image was taken, etc.), combinations thereof, or any other suitable data.

In some embodiments, for each biometric reference map, the biometric component 230 associates the biometric reference map with an image, of the set of images. The image with which the biometric reference map is associated is the image from which the biometric reference map was generated. Similarly, the image with which the biometric reference map is associated is the image from which the face image, used to generate the biometric reference map, was taken.

In operation 360, the communication component 240 transmits the set of face images to a reference server. In some embodiments, the communication component 240 removes the set of face images from the mobile computing device. The removal of the set of face images may be performed in response to transmitting the set of facial images.

In operation 370, the storage component 250 stores the set of biometric reference maps on the mobile computing device. The set of biometric reference maps may be stored securely on the mobile computing device to retain privacy over other known systems. Further, the set of biometric reference maps may be associated with an application, such that deletion or corruption of the application removes the set of biometric reference maps from memory of the mobile computing device. The set of biometric reference maps may also be stored with reference to an image from which one or more biometric reference maps were generated. In some instances, the image, giving rise to one or more biometric reference maps, may be modified or metadata associated with the image may be modified to reflect a link or pointer to the biometric reference maps generated from that image. Removal of the biometric reference maps from memory of the mobile computing device may automatically cause removal of links, references, pointers, or metadata associated with the biometric reference maps within or associate with a specified image.

In some embodiments, the storage component 250 stores the set of biometric reference maps as encrypted data within the mobile computing device. The storage component 250 may encrypt the set of biometric reference maps to generate an encrypted set of biometric reference maps. Each biometric reference map or encrypted biometric reference map may be associated with an application on the mobile computing device and with an image from which a face, represented by the biometric reference map, was taken. The storage component 250 may store the encrypted set of biometric reference maps within a memory or storage medium on or associated with the mobile computing device.

The storage component 250 may store the set of biometric reference maps (e.g., metadata for the set of images) within a table, encrypted table, an array, or any other suitable data structure. In some instances, the storage component 250 stores the set of biometric reference maps in an encrypted database table. The storage component 250 may also store the set of biometric reference maps as a set of vectors. For example, a biometric reference map may be stored as an encrypted vector of float numbers. The vector may be understood as a vector space with dimension 512. Such a database table may include a media identification (e.g., an identification for an underlying image) and other suitable data in addition to the biometric reference map or maps.

In some embodiments, the set of biometric reference maps or an application associated with the set of biometric reference maps may be corrupted, deleted, or lost. Similarly, a mobile computing device storing the set of biometric reference maps may be lost, damaged, destroyed, reformatted, or otherwise have the set of biometric reference maps become inaccessible. In such instances, a portion of the method 300 may be performed. For example, upon reinstallation of an application and sign in by a specified user, the application may initiate operations to generate the set of biometric reference maps for images accessible to the mobile computing device on which the application was reinstalled. The image processing system 160 may determine that no set of biometric reference maps are stored on the mobile computing device. The image processing system 160 may then query the reference server to determine whether a set of face images are stored on the reference server and associated with the mobile computing device or the user. Upon receiving the set of face images from the reference server, the image processing system 160 may perform operations 350, 360, and 370 to generate and store a set of biometric reference maps on the mobile computing device. The image processing system 160 may also access the set of images to determine if any images are stored on the mobile computing device but not represented among the set of facial images. In such situations, the image processing system 160 may process the unrepresented images using at least a portion of the method 300 to add facial images corresponding to the unrepresented images onto the reference server and add biometric reference maps, to the set of biometric reference maps, which correspond to the unrepresented images.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 4:
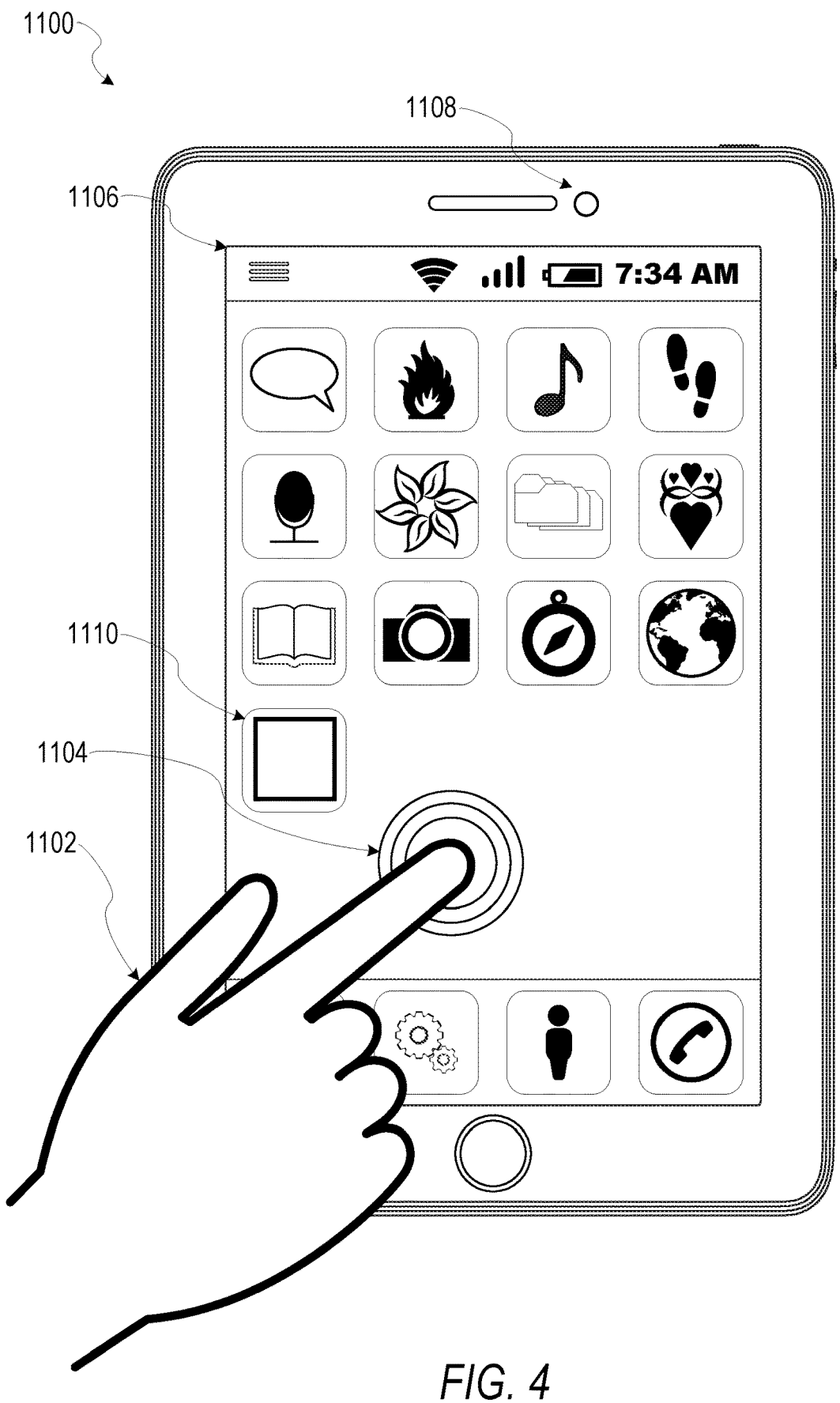
FIG. 4 is a user interface diagram depicting an example mobile device and mobile operating system interface, according to some example embodiments.

FIG. 4 illustrates an example mobile device 1100 executing a mobile operating system (e.g., IOS™, ANDROID™, WINDOWS® Phone, or other mobile operating systems), consistent with some embodiments. In one embodiment, the mobile device 1100 includes a touch screen operable to receive tactile data from a user 1102. For instance, the user 1102 may physically touch 1104 the mobile device 1100, and in response to the touch 1104, the mobile device 1100 may determine tactile data such as touch location, touch force, or gesture motion. In various example embodiments, the mobile device 1100 displays a home screen 1106 (e.g., Springboard on IOS™) operable to launch applications or otherwise manage various aspects of the mobile device 1100. In some example embodiments, the home screen 1106 provides status information such as battery life, connectivity, or other hardware statuses. The user 1102 can activate user interface elements by touching an area occupied by a respective user interface element. In this manner, the user 1102 interacts with the applications of the mobile device 1100. For example, touching the area occupied by a particular icon included in the home screen 1106 causes launching of an application corresponding to the particular icon.

The mobile device 1100, as shown in FIG. 4, includes an imaging device 1108. The imaging device 1108 may be a camera or any other device coupled to the mobile device 1100 capable of capturing a video stream or one or more successive images. The imaging device 1108 may be triggered by the image processing system 160 or a selectable user interface element to initiate capture of a video stream or succession of images and pass the video stream or succession of images to the image processing system 160 for processing according to the one or more methods described in the present disclosure.

Many varieties of applications (also referred to as "apps") can be executing on the mobile device 1100, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1100 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1100 includes a social messaging app 1110 that, consistent with some embodiments, allows users to exchange ephemeral messages that include media content. In this example, the social messaging app 1110 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the image processing system 160 may analyze images and generate biometric image data within the ephemeral message, and transmit the ephemeral message to another device using the ephemeral message system.

Software Architecture

Figure 5:
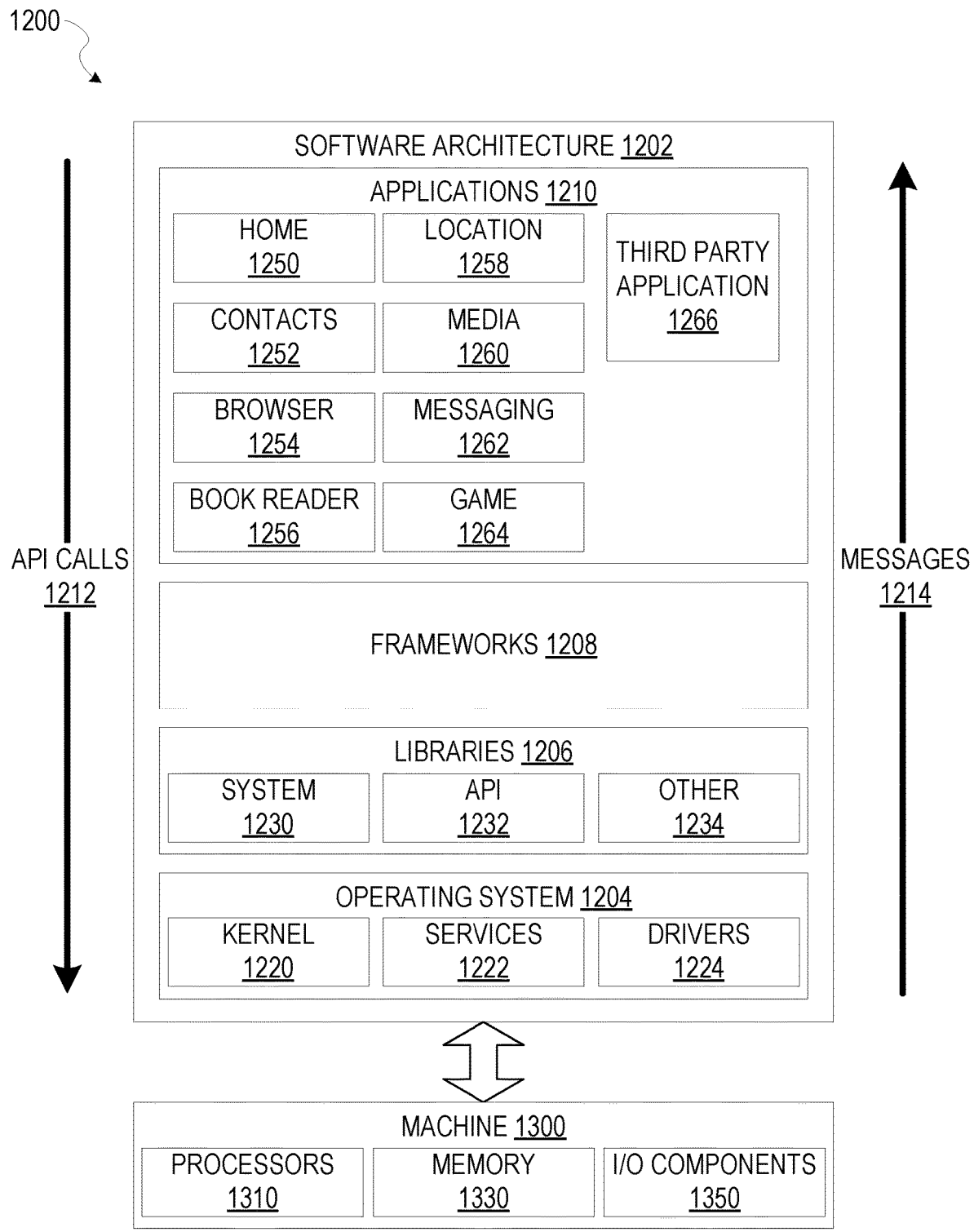
FIG. 5 is a block diagram illustrating an example of a software architecture that may be installed on a machine, according to some example embodiments.

FIG. 5 is a block diagram 1200 illustrating an architecture of software 1202, which can be installed on the devices described above. FIG. 5 is merely a non-limiting example of a software architecture, and it will be appreciated that many other architectures can be implemented to facilitate the functionality described herein. In various embodiments, the software 1202 is implemented by hardware such as machine a 1300 of FIG. 6 that includes processors 1310, memory 1330, and I/O components 1350. In this example architecture, the software 1202 can be conceptualized as a stack of layers where each layer may provide a particular functionality. For example, the software 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third party application 1266. According to some embodiments, the applications 1210 are programs that execute functions defined in the programs. Various programming languages can be employed to create the applications 1210, structured in a variety of manners, such as object-oriented programming languages (e.g., Objective-C, Java, or C++) or procedural programming languages (e.g., C or assembly language). In a specific example, the third party application 1266 (e.g., an application developed using the ANDROID™ or IOS™ software development kit (SDK) by an entity other than the vendor of the particular platform) may be mobile software running on a mobile operating system such as IOS™, ANDROID™ WINDOWS® PHONE, or another mobile operating systems. In this example, the third party application 1266 can invoke the API calls 1212 provided by the operating system 1204 to facilitate functionality described herein.

Example Machine Architecture and
Machine-Readable Medium

Figure 6:
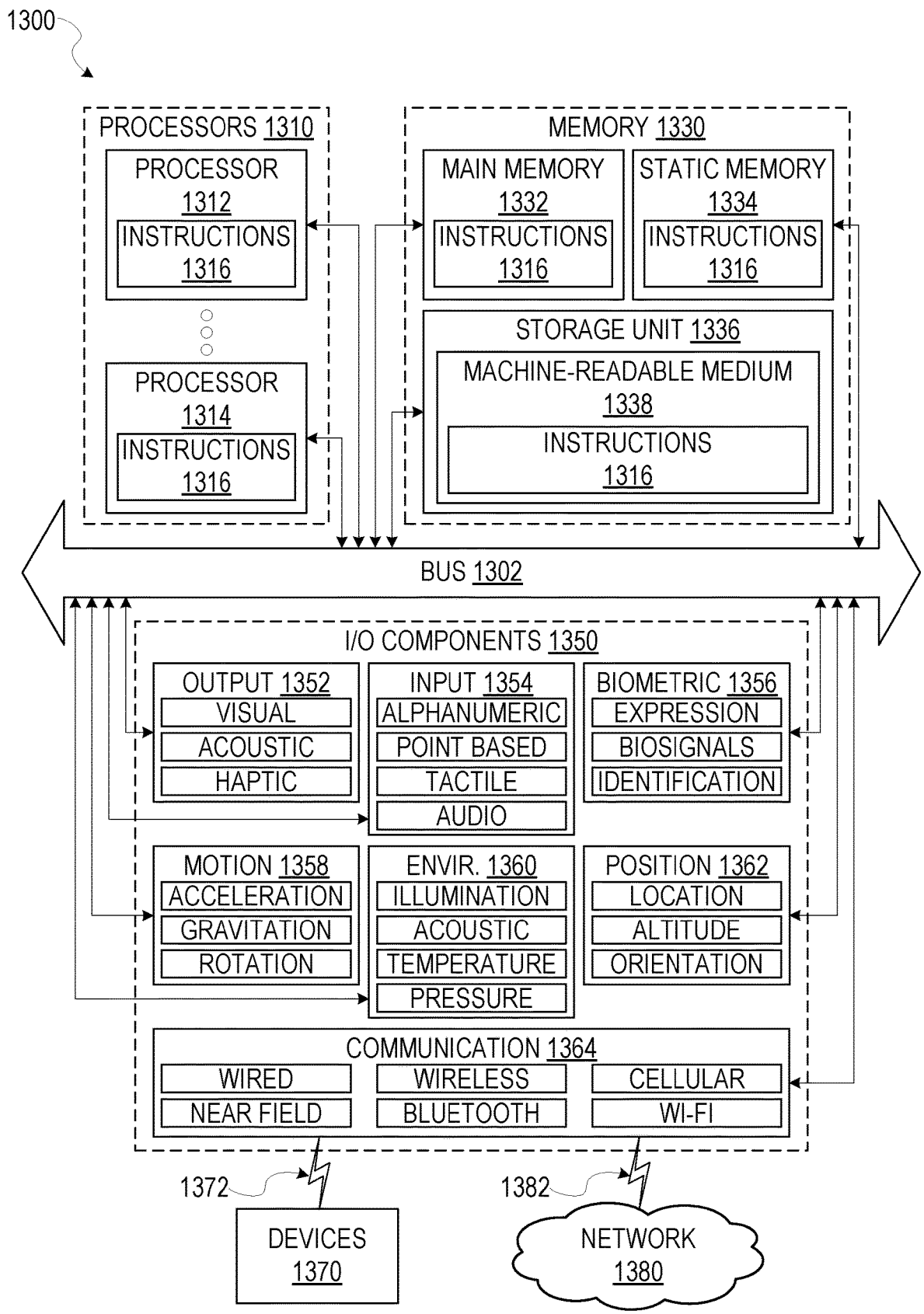
FIG. 6 is a block diagram presenting a diagrammatic representation of a machine in the form of a computer system within which a set of instructions may be executed for causing the machine to perform any of the methodologies discussed herein, according to an example embodiment.

FIG. 6 is a block diagram illustrating components of a machine 1300, according to some embodiments, able to read instructions (e.g., processor executable instructions) from a machine-readable medium (e.g., a non-transitory machine-readable storage medium) and perform any of the methodologies discussed herein. Specifically, FIG. 6 shows a diagrammatic representation of the machine 1300 in the example form of a computer system, within which instructions 1316 (e.g., software, a program, an application, an applet, an app, or other executable code) for causing the machine 1300 to perform any of the methodologies discussed herein can be executed. In alternative embodiments, the machine 1300 operates as a standalone device or can be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1312 and a processor 1314 that may execute the instructions 1316. The term "processor" is intended to include multi-core processors that may comprise two or more independent processors (also referred to as "cores") that can execute instructions 1316 contemporaneously. Although FIG. 6 shows multiple processors 1310, the machine 1300 may include a single processor with a single core, a single processor with multiple cores (e.g., a multi-core processor), multiple processors with a single core, multiple processors with multiples cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown in an example embodiment to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by processors of the machine 1300 (e.g., processors 1310), cause the machine 1300 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 6. The I/O components 1350 are grouped according to functionality merely for simplifying the following discussion, and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1370 may be another machine or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 "non-transitory" should not be construed to mean that the medium is incapable of movement; the medium should be considered as being transportable from one physical location to another. Additionally, since the machine-readable medium 1338 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
accessing a first image stored on a device;
determining a set of positions for a set of facial features depicted within the first image;
generating a set of biometric reference maps by inputting the set of positions for the set of facial features into a machine learning model to receive the set of biometric reference maps from the machine learning model based on the inputted set of positions, wherein the machine learning model is trained to generate biometric reference maps based on face images and positions; and applying the set of biometric reference maps on a second image.

2. The method of claim 1, further comprising:
accessing a set of images, wherein the set of images comprises the first image; and
determining a set of positions for a set of facial features depicted within the set of images, wherein generating the set of biometric reference maps is based on the inputting of the set of positions.

3. The method of claim 1, further comprising:
identifying one or more faces depicted in a set of images; and
generating a set of face images from the set of images based on facial features determined for each face of the one or more faces.

4. The method of claim 3, wherein each face image in the set of face images comprising a face that is aligned within one or more boundaries of the face image.

5. The method of claim 3, further comprising:
determining the facial features of each face of the one or more faces depicted in the set of images.

6. The method of claim 3, further comprising:
transmitting the set of face images to a reference server.

7. The method of claim 6, further comprising removing the set of face images from the device in response to transmitting the set of face images to the reference server.

8. The method of claim 3, wherein generating the set of face images from the set of images further comprising:
generating a set of thumbnail images, wherein each thumbnail image includes a single face.

9. The method of claim 3, wherein generating the set of face images from the set of images further comprising:
for each image in the set of images,
determining whether a number of facial features depicted in the image exceeds a predetermined threshold value; and
in response to determining that the number of facial features depicted in the image does not exceed the predetermined threshold value, disregarding a face depicted in the image.

10. The method of claim 3, wherein identifying the one or more faces in the set of images further comprises:
identifying a set of coordinates associated with the one or more faces in the set of images, and
generating one or more bounding boxes around each face of the one or more faces.

11. The method of claim 1, further comprising:
transmitting the set of biometric reference maps to a reference server.

12. The method of claim 1, further comprising:
storing the set of biometric reference maps on the device.

13. The method of claim 12, wherein storing the set of biometric reference maps further comprises:
encrypting the set of biometric reference maps to generate an encrypted set of biometric reference maps; and
storing the encrypted set of biometric reference maps on the device.

14. The method of claim 1, wherein generating the set of biometric reference maps further comprises:
analyzing the set of face images and the set of positions using a machine learning model trained to identify the faces depicted in the face images.

15. A system comprising:
one or more processors; and
a non-transitory processor-readable storage medium storing processor executable instructions that, when executed by the one or more processors, cause the one or more processors to perform operations comprising:
accessing a first image stored on a device;
determining a set of positions for a set of facial features depicted within the first image;
generating a set of biometric reference maps by inputting the set of positions for the set of facial features into a machine learning model to receive the set of biometric reference maps from the machine learning model based on the inputted set of positions, wherein the machine learning model is trained to generate biometric reference maps based on face images and positions; and
applying the set of biometric reference maps on a second image.

16. The system of claim 15, the operations further comprising:
accessing a set of images, wherein the set of images comprises the first image; and
determining a set of positions for a set of facial features depicted within the set of images, wherein generating the set of biometric reference maps is based on the inputting of the set of positions.

17. The system of claim 15, the operations further comprising:
identifying one or more faces depicted in a set of images; and
generating a set of face images from the set of images based on facial features determined for each face of the one or more faces.

18. The system of claim 17, wherein each face image in the set of face images comprising a face that is aligned within one or more boundaries of the face image.

19. The system of claim 17, wherein comprising:
determining the facial features of each face of the one or more faces depicted in the set of images.

20. A non-transitory processor-readable storage medium storing processor executable instructions that, when executed by a processor of a machine, cause the machine to perform operations comprising:
accessing a first image stored on a device;
determining a set of positions for a set of facial features depicted within the first image;
generating a set of biometric reference maps by inputting the set of positions for the set of facial features into a machine learning model to receive the set of biometric reference maps from the machine learning model based on the inputted set of positions, wherein the machine learning model is trained to generate biometric reference maps based on face images and positions; and
applying the set of biometric reference maps on a second image.

* * * * *